Sept. 18, 1962  F. K. SAVAGE ET AL  3,054,736
METHOD AND APPARATUS FOR RECOVERY OF COPPER
AND ZINC FROM SCRAP
Filed Nov. 21, 1958
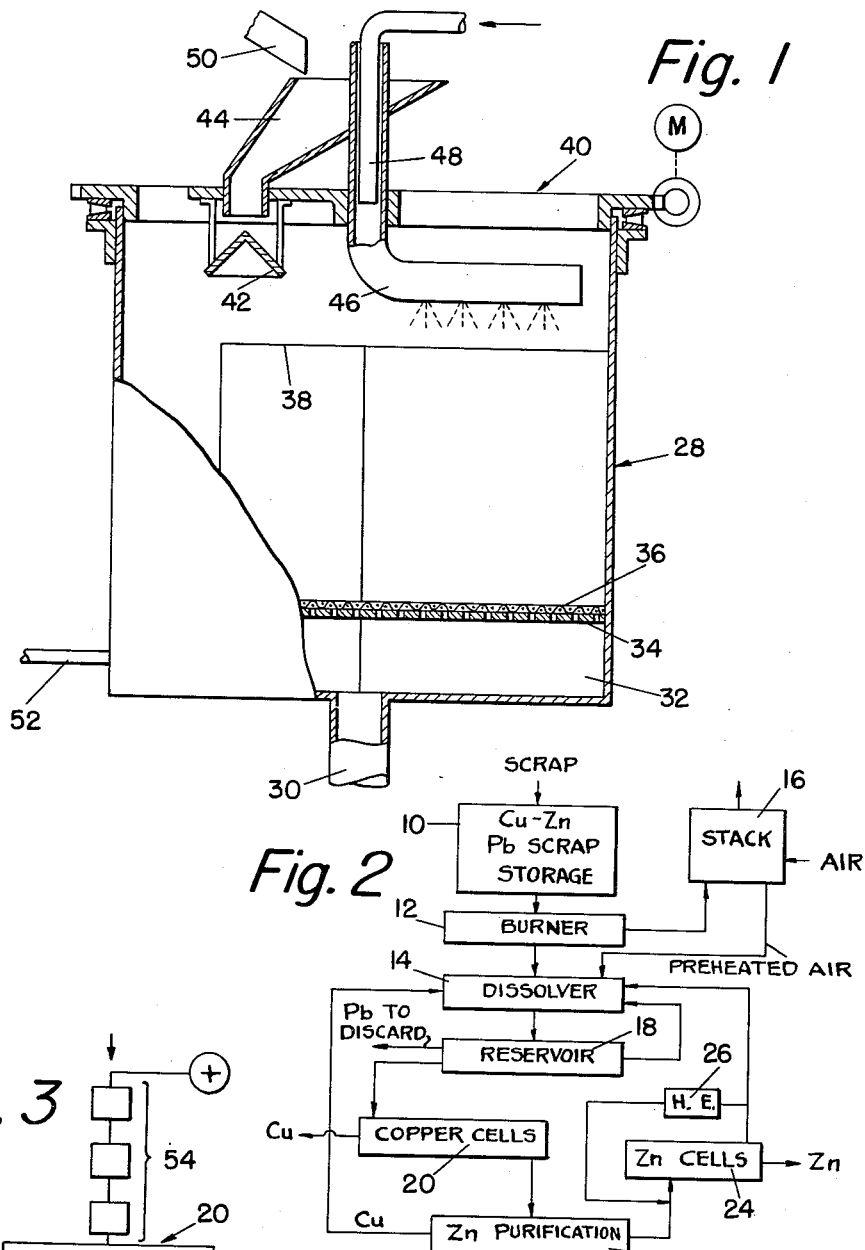
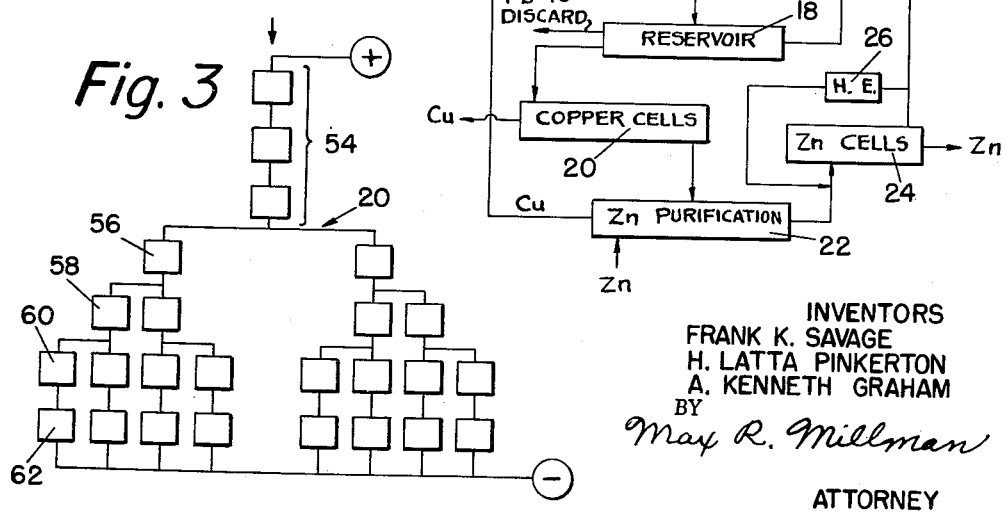
INVENTORS
FRANK K. SAVAGE
H. LATTA PINKERTON
A. KENNETH GRAHAM
BY
Max R. Millman
ATTORNEY

United States Patent Office 3,054,736
Patented Sept. 18, 1962

3,054,736
METHOD AND APPARATUS FOR RECOVERY OF COPPER AND ZINC FROM SCRAP
Frank K. Savage, Kalamazoo, Mich., and Henry Latta Pinkerton, Hatboro, and Arthur Kenneth Graham, Jenkintown, Pa., assignors to Graham, Savage & Associates, Inc., Kalamazoo, Mich., a corporation of Illinois
Filed Nov. 21, 1958, Ser. No. 775,584
5 Claims. (Cl. 204—108)

This invention relates to the economic and efficient recovery of copper and/or zinc in the form of high purity cathodes from copper-zinc alloy scrap and/or copper scrap and more particularly from so-called "new" scrap from machining operations on this class of metals. New scrap frequently amounts to 40 or 50 percent of the parent metal and in certain cases even more, as, for example, leaded screw machine stock. For economy, therefore, the scrap must be reworked for re-use. In recent years, secondary copper recovered in the United States has equaled the mine production of copper, and half of this secondary copper has come from new copper and copper alloy scrap.

Heretofore, new scrap was reworked directly by melting, a process which has been costly, wasteful and troublesome, especially when applied to finely-divided material such as rod borings or screw machine turnings. Much of this material is of relatively small particle size. Hence, its surface area is large, its bulk density low and the heat transfer of the mass poor. When it is introduced into a melting furnace, it tends to float on the surface and heats slowly. Owing to the large exposed area of the floating mass, a great deal of oxidation occurs unless an expensive special-atmosphere furnace is employed. Such oxidation results in excessive loss of metal in slag or dross.

New scrap also contains about 3 percent water and oil, on the average and, since an explosion may result from adding wet scrap to a mass of molten metal, the scrap is usually dried before melting. This is not only costly but such drying may cause oxidation, thereby increasing the melting loss.

There are still other difficulties in the direct reworking of such material by melting. Scrap collected from many sources varies widely in composition. Hence, a melt composed solely of scrap or one containing a substantial portion thereof will be of uncertain composition and content of impurities. At times, the composition can be adjusted by suitable further additions of virgin metal or the impurities can be reduced to acceptable amounts by certain refining measures. Such refinement measures usually involve some concurrent losses of desirable constituents.

At other times, certain impurities will render the melt totally unfit for its intended use. In practice, extensive precautions are taken to prevent such an occurrence by the strictest segregation of scrap bearing such constituents. One such constituent is lead which is present in certain alloys in amounts from 1 to 5 percent to impart free machining qualities to the metal. For alloys that are to be severely worked or drawn, the lead content must be held below 0.01 or 0.02 percent because lead causes hot-shortness in copper alloys and also has a pronounced deleterious effect on ductility at room temperature. Thus, a small amount of leaded brass scrap could intolerably contaminate a large charge of non-leaded alloy. It is therefore particularly important that leaded scrap be segregated from all others. It is for this reason that the market value of leaded scrap is lower than that of equivalent non-leaded alloy scrap.

It is an important object of this invention to provide a method of recovering pure copper and pure zinc of virgin quality from copper-zinc alloys which overcomes the disadvantages of reworking the alloys by melting, set forth hereinbefore.

It is another object of the invention to provide a method of reclaiming electrolytic copper and zinc from copper-zinc alloy scrap notwithstanding the presence of heavy metals other than copper and zinc in the scrap.

A further object of the invention is to provide method and apparatus for recovering from copper-zinc alloy scrap pure copper and zinc in massive form suitable for melting with a minimum of loss.

Basically, the invention comprises the concurrent recovery of electrolytic copper and zinc from a common electrolyte. The common electrolyte is a non-oxidizing, preferably sulfuric, acid solution of copper and zinc resulting from an acid-aeration treatment of copper-zinc alloy scrap. This acid solution is electrolyzed to plate copper until the copper content is reduced to 1–3 gms./liter, then the copper content is further reduced by electrolytic or chemical precipitation below 0.02 gm./liter and the resultant solution electrolyzed to plate zinc, with the final metal-depleted, acid-enriched solution preferably being recycled to dissolve additional scrap.

The principles of the invention will best be understood with reference to the accompanying drawings, wherein:

FIGURE 1 is an elevational view, partly broken away and shown in section, of one form of a scrap dissolver;

FIGURE 2 is a schematic flowsheet of the overall process; and

FIGURE 3 is a diagrammatic view of an arrangement of cells used in the copper electrowinning phase of the process.

Reference is now made to the drawings wherein similar reference characters are used for corresponding elements throughout. The overall process as shown in FIGURE 2 comprises first feeding the copper-zinc alloy scrap from a storage container 10 to a burner 12 where the oil and water are burned off. Iron is then removed magnetically and the dry scrap is fed to a dissolver 14 of the type shown in FIGURE 1 which is equipped with means to alternately wet the scrap with a non-oxidizing acid, such as sulfuric, drain the acid and then aerate the acid-wet scrap in a manner soon to be described. The air may preferably be preheated by passing through a heat exchanger in the stack 16. The acid solution containing dissolved copper and zinc is then delivered to a reservoir 18 from which it flows into a plurality of copper electrowinning cells 20, the schematic arrangement of which is shown more particularly in FIGURE 3. Copper is plated out in said cells until the copper content is reduced to 1–3 gms./liter whence the effluent goes to a zinc purification container 22. There, electrolytically or chemically as by the addition of zinc powder, the copper is precipitated out until the solution has a copper content below 0.02 gm./liter. This solution is then delivered to a zinc electrowinning cell 24 where zinc is plated out, a heat exchanger 26 being provided to bring the influent solution temperature to cell 24 down to approximately 100° F. The metal-depleted acid-enriched effluent from the zinc powder which was precipitated in the zinc purification cell is recycled back to the dissolver as is the copper container.

Referring now to FIGURE 1, the same shows a container 28 in which dissolution of the scrap can be effected. The container has a central drainage port 30 in its bottom wall upon which is supported a spider having radial partitions 32 extending to the peripheral wall of the container. A perforated plate 34 is supported upon the spider and in turn supports an acid proof cloth 36. Positioned on the cloth and plate is an upper spider having radial partitions 38 in alignment with the lower partitions 32 and terminating below the upper end of the container.

Rotatably mounted by any suitable means on the upper end of the container is a structure 40 which at one point mounts a scrap feed distributor 42 and a scrap feed pipe 44. At another point the structure 40 mounts a lateral acid spray pipe 46 which is connected to an acid delivery conduit 48 that extends concentrically through the scrap feed pipe 44 and a hopper 50. Any suitable means may be employed to rotatably drive the structure 40 from a motor M so that first scrap is fed selectively into the compartments at a desired rate to be positioned on the cloth and perforated plate and then acid, preferably sulfuric, is selectively sprayed into the compartments at a desired rate.

Air inlet ports 52 are provided in the peripheral wall of the container beneath the perforated plate. Air is admitted in a slow, preferably preheated stream after the acid has drained off the scrap. The cycle is repeated until substantially all the copper and zinc from the scrap is dissolved, the metal-enriched acid solution draining through the port 30 and then being delivered to the reservoir 18, FIGURE 2. Any lead which the scrap may have contained will be insoluble or form insoluble lead sulfate, in which form it can be removed from the system. The introduction of air can be controlled by air valves (not shown) which may be operated by a programmed timer (not shown). This system may be synchronized with the rotation of the structure 40.

The acid strength may vary but it is desirable to employ a sulfuric acid solution of concentration 50–250 gms./liter free sulfuric acid, preferably 125–200 gms./liter. It is also desirable to use the acid at a temperature between 110 and 150° F., preferably between 125 and 135° F.

Although the acid should be drained rapidly, the duration of aeration may be varied widely, it having been observed that oxidation of the acid-wet scrap appears to be complete in about twenty to thirty minutes. Each cycle, that is from acid to acid should be at least 2 minutes. It has been found that more scrap can be dissolved per hour if the total cycle is five minutes, i.e., one to two minutes for wetting and draining and three to four minutes for aeration. When operating properly, the feed of fresh scrap, which should preferably be continuous, should be at a rate equal to the dissolving rate. It is to be understood that while aeration is preferred, oxidation of the acid-wet scrap can also be effected by other oxidizing media.

The solution in the reservoir is fed in cascade through a plurality of copper electrowinning cells 20 where it is electrolyzed to plate copper using insoluble anodes, such as of lead or lead alloy. As the solution goes from cell to cell it becomes progressively depleted of copper and enriched with acid. The arrangement of cells which we found most effective for this purpose is shown diagrammatically in FIGURE 3 and is based on the principle that banks of cells can be so arranged and electrically interconnected that copper can be depleted progressively with decreasing current densities whereby each cell operates at good efficiency for the production of electrolytic copper until the copper content is reduced to 1–3 gms./liter whereupon the copper is stripper from the solution which is thereafter electrolyzed to recover electrolytic zinc.

The first group of cells 54 are connected electrically in series and are the first to receive the metal-enriched acid solution from the reservoir 18. Being in series each cell receives the full current and the cathodic current density is at its maximum, which for illustrative purposes may be 24 amperes per square foot (a.s.f.). When the copper content has been reduced to too low a value for the production of sound cathodes at good current efficiency, preferably 100% efficiency, the solution passes to a bank of two cells 56 electrically in parallel but each connected in series with the cell 54. This halves the current density which may now be 12 a.s.f. When the copper content again falls to too low a value for the production of sound cathodes at good efficiency, the solution passes to another bank of four cells 58 in parallel, pairs of which are in turn connected in series to each of the previous cells 56, thus again halving the current density to a value of 6 a.s.f. in the example chosen. Again when the copper content falls to too low a value for the production of sound cathodes at good efficiency, the solution passes to a final bank of eight cells 60 in parallel, pairs of which are in turn connected in series to each of the previous cells 58, thus again halving the current density to a value of 3 a.s.f. for the example chosen.

It will be understood that this arrangement may be varied and the actual number of cathodes in series and parallel will depend upon production requirements; upon the technological details of the process, such as temperature, agitation, rate of solution flow and the nature and concentration of addition agents and upon economic considerations.

It has been found that for a given set of conditions, sound cathodes can be made at good efficiencies if the copper content is above the values shown in Table I when the current density is at the value given.

*Table I*

| Current density (a.s.f.): | Minimum copper content of solution (gms./liter) |
|---|---|
| 24 | 15 |
| 12 | 10 |
| 6 | 5 |
| 3 | 2 |

Before the acid solution can be used to produce electrolytic zinc, the copper content must not exceed 0.02 gm./liter. Accordingly, the effluent from the cells 60 is subjected to a stripping operation wherein the copper is precipitated as a powder which, as mentioned before, can be recycled to the dissolver 14. The effluent passes from cells 60 to one or more cells 62 wherein the electrolysis continues at low current densities, generally in the order of 2–4 a.s.f. These latter cells may be desirably equipped with lead cathodes and anodes and provision made for strong solution agitation as with compressed air. The copper content can be reduced to about 0.1 gm./liter. The copper which deposits as floc is carried with the solution to the zinc purification tank 22 where enough zinc dust is added to precipitate any remaining copper and any other metals below zinc in the electrochemical series until the copper content is below 0.02 gm./liter.

The copper and the other heavy metals may also be stripped of the effluent from cells 60 by the direct addition of zinc powder to the effluent. However, excessive amounts of zinc may be consumed owing to the acid content of the effluent. Therefore, it has been found that stripping the copper and other heavy metals by a combination of electrolysis in the cells 62 followed by the addition of zinc in the purification tank 22 is more economical than stripping directly with zinc even allowing for the low current efficiency (about 50% on the average) in the cells 62.

The powdered copper is removed from the zinc purification tank by decantation, centrifugation or filtration and the clear solution is then delivered for electrowinning to the zinc cells 24, provision being made to cool the filtrate to approximately 100° F., by a suitable heat exchanger 26. In the zinc electrolysis, not all of the zinc need be removed and the effluent therefrom may contain, for example, 40–50 gms./liter of zinc. The effluent will be quite high in acid as the acid concentration rises in proportion to the copper and zinc which has been removed by electrolysis.

The stream of effluent from the zinc cells 24 is mixed with a stream of recycled solution from the reservoir 18, the flow of the latter being adjusted so that after passing through the dissolver 14, the mixed streams are at the desired metal and acid concentration. While the acid concentration in the reservoir may be varied over wide limits, it would be desirable to maintain it at some value most suitable for the copper cell feed. The acid concentration in the mixed stream being sprayed into the dissolver 14 is desirably held at 150 gms./liter. In passing through the dissolver, the acid concentration will fall by an amount related to the increase in metal concentration. The latter may be about 50 gms./liter copper plus zinc, whereby the acid concentration in the reservoir 18 will be about 75 gms./liter, which is a desirable value for the copper cell feed.

It is also economically advantageous to maintain the copper content of the cell feed as high as possible so that the copper which is removed as unmarketable powder is as small a fraction of the total copper as possible. About 65 gms./liter of copper approximates the saturation point of a solution containing 75 gms./liter of free sulfuric acid and about 75 gms./liter of zinc.

While a preferred embodiment of the invention has been shown and described herein, it will be understood that minor variations may be made by skilled artisans without departing from the spirit of the invention and the scope of the appended claims. Thus, addition agents, such as glue, goulac, etc., known to be effective in improving the quality of the copper and zinc electrodeposits may be used. The electrolyte may also be made up and maintained with distilled or de-ionized water to prevent the accumulation of chlorides in the electrolyte which promote the solubility of lead and contribute to the contamination of the zinc cathodes with lead. Also a particular alloy of lead with 1% silver may be used as anodes to reduce the solubility of the lead anode in the electrolyte and also to reduce anode polarization and hence cell voltage and power cost.

We claim:

1. A process of recovering electrolytic copper from scrap copper-zinc alloys comprising first wetting the dry scrap with aqueous sulfuric acid, then draining the acid followed by aeration and repeating the cycle until substantially all the copper and zinc are dissolved, and then electrolyzing the solution to plate copper using insoluble anodes in successive steps while reducing the current density in proportion to a decrease of copper concentration so that a cathode efficiency of substantially 100% is realized in each step and until the solution is depleted to a copper content of 1–3 gms./liter.

2. A process of concurrently recovering electrolytic copper and zinc from scrap copper-zinc alloys comprising first wetting the dry scrap with aqueous sulfuric acid, then draining the acid followed by aeration and repeating the cycle until substantially all the copper and zinc are dissolved, electrolyzing the solution to plate copper using insoluble anodes in successive steps while reducing the current density in proportion to a decrease of copper concentration so that a cathode efficiency of substantially 100% is realized in each step and until the solution is depleted to a copper content of 1–3 gms./liter, precipitating copper and other heavy metals from said electrolyzed solution until the copper content is reduced below 0.02 gm./liter, separating the precipitated metals, electrolyzing the resultant solution using insoluble anodes to plate zinc and recycling the final metal-depleted, acid-enriched solution for the continued dissolution of the scrap.

3. The process of claim 2 wherein each cycle of wetting, draining and aerating of the scrap comprises at least 2 minutes.

4. The process of claim 2 wherein the precipitation of the copper and other heavy metals from the electrolyzed solution is effected first electrolytically and then by the addition of zinc powder.

5. The process of claim 2 wherein the precipitation of the copper and other heavy metals from the electrolyzed solution is effected by the addition of zinc powder.

References Cited in the file of this patent

UNITED STATES PATENTS

| | | |
|---|---|---|
| 1,084,351 | Mackay | Jan. 13, 1914 |
| 1,353,995 | Greenawalt | Sept. 28, 1920 |
| 1,509,947 | Greenawalt | Sept. 30, 1924 |
| 1,746,313 | Levy | Feb. 11, 1930 |
| 1,890,856 | Lewin | Dec. 13, 1932 |
| 1,920,819 | Rose | Aug. 1, 1933 |
| 1,949,927 | Corson | Mar. 6, 1934 |
| 1,996,985 | Truthe | Apr. 9, 1935 |
| 2,016,718 | Hollard | Oct. 8, 1935 |
| 2,361,013 | Corren | Oct. 24, 1944 |
| 2,556,635 | Skowronski et al. | June 12, 1951 |
| 2,769,775 | Schloen et al. | Nov. 6, 1956 |

FOREIGN PATENTS

| | | |
|---|---|---|
| 100 of 1911 | Great Britain | Jan. 2, 1912 |